(12) United States Patent
Svendsen et al.

(10) Patent No.: US 10,372,615 B1
(45) Date of Patent: *Aug. 6, 2019

(54) DATA MANAGEMENT FOR CACHE MEMORY

(71) Applicant: Ampere Computing LLC, Santa Clara, CA (US)

(72) Inventors: Kjeld Svendsen, Sunnyvale, CA (US); John Gregory Favor, Scotts Valley, CA (US)

(73) Assignee: AMPERE COMPUTING LLC, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/712,519

(22) Filed: Sep. 22, 2017

Related U.S. Application Data

(63) Continuation of application No. 15/098,573, filed on Apr. 14, 2016, now Pat. No. 9,798,672.

(51) Int. Cl.
*G06F 12/08* (2016.01)
*G06F 12/0891* (2016.01)
*G06F 12/0875* (2016.01)
*G06F 12/0897* (2016.01)

(52) U.S. Cl.
CPC ...... *G06F 12/0891* (2013.01); *G06F 12/0875* (2013.01); *G06F 12/0897* (2013.01); *G06F 2212/45* (2013.01); *G06F 2212/60* (2013.01)

(58) Field of Classification Search
USPC ........................................................ 711/133
See application file for complete search history.

(56) References Cited

U.S. PATENT DOCUMENTS

| | | | |
|---|---|---|---|
| 6,597,363 | B1 | 7/2003 | Duluk, Jr. et al. |
| 7,167,181 | B2 | 1/2007 | Duluk, Jr. et al. |
| 7,366,842 | B1 | 4/2008 | Acocella et al. |
| 8,310,928 | B2 | 11/2012 | Samuels et al. |
| 8,719,509 | B2 | 5/2014 | Wang et al. |
| 8,806,137 | B2 | 8/2014 | Rabinovitch et al. |
| 8,824,490 | B2 | 9/2014 | Samuels et al. |
| 8,825,937 | B2 | 9/2014 | Atkisson et al. |
| 8,930,630 | B2 | 1/2015 | Park |

(Continued)

OTHER PUBLICATIONS

U.S. Appl. No. 15/098,573, filed Apr. 14, 2016.

*Primary Examiner* — Mano Padmanabhan
*Assistant Examiner* — Jean C Edouard
(74) *Attorney, Agent, or Firm* — Alston & Bird LLP

(57) ABSTRACT

Various aspects provide for managing data associated with a cache memory. For example, a system can include a cache memory and a memory controller. The cache memory stores data. The memory controller maintains a history profile for the data stored in the cache memory. In an implementation, the memory controller includes a filter component, a tagging component and a data management component. The filter component determines whether the data is previously stored in the cache memory based on a filter associated with a probabilistic data structure. The tagging component tags the data as recurrent data in response to a determination by the filter component that the data is previously stored in the cache memory. The data management component retains the data in the cache memory in response to the tagging of the data as the recurrent data.

19 Claims, 11 Drawing Sheets

(56) References Cited

U.S. PATENT DOCUMENTS

| | | |
|---|---|---|
| 8,959,289 B2 | 2/2015 | Ghai et al. |
| 9,003,126 B2 | 4/2015 | Cai et al. |
| 9,008,100 B2 | 4/2015 | Samuels et al. |
| 9,176,879 B2 | 11/2015 | Lilly et al. |
| 9,189,414 B1 | 11/2015 | Shim et al. |
| 9,213,641 B2 | 12/2015 | Collura et al. |
| 9,280,470 B2 | 3/2016 | Iyengar |
| 9,298,619 B2 | 3/2016 | Collura et al. |
| 9,298,626 B2 | 3/2016 | Busaba et al. |
| 2003/0061469 A1 | 3/2003 | Solomon et al. |
| 2005/0216669 A1 | 9/2005 | Zhu et al. |
| 2007/0028070 A1 | 2/2007 | Avergun et al. |
| 2007/0061520 A1 | 3/2007 | Jones et al. |
| 2007/0234324 A1 | 10/2007 | Ananthakrishnan et al. |
| 2008/0229021 A1* | 9/2008 | Plamondon ......... H04L 67/2847 711/125 |
| 2011/0093654 A1 | 4/2011 | Roberts et al. |
| 2011/0307447 A1* | 12/2011 | Sabaa ................. H04L 67/2842 707/637 |
| 2011/0307659 A1* | 12/2011 | Hans ..................... G06F 3/0613 711/114 |
| 2012/0110111 A1* | 5/2012 | Luna ....................... H04L 67/04 709/213 |
| 2012/0137059 A1 | 5/2012 | Yang et al. |
| 2012/0221774 A1 | 8/2012 | Atkisson et al. |
| 2012/0246219 A1 | 9/2012 | Bhogal et al. |
| 2012/0311021 A1* | 12/2012 | Zhu ..................... G06F 11/1453 709/203 |
| 2012/0317362 A1* | 12/2012 | Hendry ............... G06F 12/0831 711/130 |
| 2012/0317370 A1* | 12/2012 | Luna ................... H04L 67/1095 711/146 |
| 2013/0042073 A1* | 2/2013 | Tao ....................... H04L 1/0053 711/133 |
| 2013/0166816 A1* | 6/2013 | Atkisson ............. G06F 12/0802 711/102 |
| 2013/0318051 A1* | 11/2013 | Kumar .............. G06F 17/30156 707/692 |
| 2014/0095775 A1* | 4/2014 | Talagala ............. G06F 12/0866 711/103 |
| 2014/0237157 A1* | 8/2014 | Takefman ........... G06F 11/1008 711/3 |
| 2014/0304475 A1* | 10/2014 | Ramanujan ........ G06F 12/0895 711/128 |
| 2014/0310470 A1 | 10/2014 | Rash et al. |
| 2015/0010143 A1 | 1/2015 | Yang |

\* cited by examiner

DATA MANAGEMENT FOR CACHE MEMORY

CROSS-REFERENCE TO RELATED APPLICATIONS

This application is a Continuation of application Ser. No. 15/098,573 filed on Apr. 14, 2016, the entire contents of which are incorporated herein by reference.

TECHNICAL FIELD

The subject disclosure relates generally to cache memory, and more particularly to managing data in cache memory.

BACKGROUND

Cache memory is often used in processing systems to store, for example, copies of frequently used data from main memory, store data evicted from a central processing unit cache, etc. This can allow faster respond time for a future request for the data in the cache memory. A cache hit occurs when the requested data can be found in the cache memory. A cache miss occurs when the requested data cannot be found in the cache memory.

Conventional cache replacement algorithms are generally employed for an "inclusive" cache memory (e.g., a cache memory where "hit" data remains in the cache memory). Furthermore, conventional cache replacement algorithms generally cannot be employed in an "exclusive" cache memory (e.g., a cache memory where "hit" data is removed from the cache memory) since an access history cannot be determined for such hit data. For example, conventional cache memory (e.g., conventional Level-3 cache memory) is unable to retain any cache hit history of data since data associated with a cache hit is read and subsequently removed from the cache memory. Therefore, conventional cache memory systems cannot track data which has temporal and/or spatial locality within the cache memory. As such, data in cache memory which could potentially be a cache hit is evicted from the cache memory, and thus performance of conventional cache memory systems is reduced.

Moreover, scanning (e.g., where a smaller reusable dataset is intermixed with larger non-reusable dataset) and thrashing (e.g., where a dataset cannot be stored in cache memory due to a size of the dataset) are common phenomena in conventional cache memory systems where data with either no re-reference intervals or very long re-reference intervals cause data with short re-reference intervals to be removed from cache memory before the data can be reused. Accordingly, low hit ratios are common in conventional cache memory systems.

The above-described description is merely intended to provide a contextual overview of current cache memory systems and is not intended to be exhaustive.

SUMMARY

The following presents a simplified summary in order to provide a basic understanding of some aspects described herein. This summary is not an extensive overview of the disclosed subject matter. It is intended to neither identify key nor critical elements of the disclosure nor delineate the scope thereof. Its sole purpose is to present some concepts in a simplified form as a prelude to the more detailed description that is presented later.

In an example embodiment, a system comprises a cache memory and a memory controller. The cache memory stores data. The memory controller maintains a history profile for the data stored in the cache memory. In an implementation, the memory controller includes a filter component, a tagging component and a data management component. The filter component determines whether the data is previously stored in the cache memory based on a filter associated with a probabilistic data structure. The tagging component tags the data as recurrent data in response to a determination by the filter component that the data is previously stored in the cache memory. The data management component retains the data in the cache memory in response to the tagging of the data as the recurrent data.

In another example embodiment, a method provides for maintaining a history profile for data stored in cache memory, determining whether the data is previously stored in the cache memory based on a filter associated with a probabilistic data structure, tagging the data as recurrent data in response to a determination that the data is previously stored in the cache memory, and retaining the data in the cache memory in response to the tagging of the data as the recurrent data.

In yet another example embodiment, a device comprises a cache memory and a memory controller. The cache memory stores data. The memory controller maintains a history profile for the data stored in the cache memory based on a Bloom filter. The memory controller also determines whether or not to remove the data from the cache memory based on the history profile and an amount of time in which the data is stored in the cache memory.

The following description and the annexed drawings set forth in detail certain illustrative aspects of the subject disclosure. These aspects are indicative, however, of but a few of the various ways in which the principles of various disclosed aspects can be employed and the disclosure is intended to include all such aspects and their equivalents. Other advantages and novel features will become apparent from the following detailed description when considered in conjunction with the drawings.

DETAILED DESCRIPTION

Figure 1:
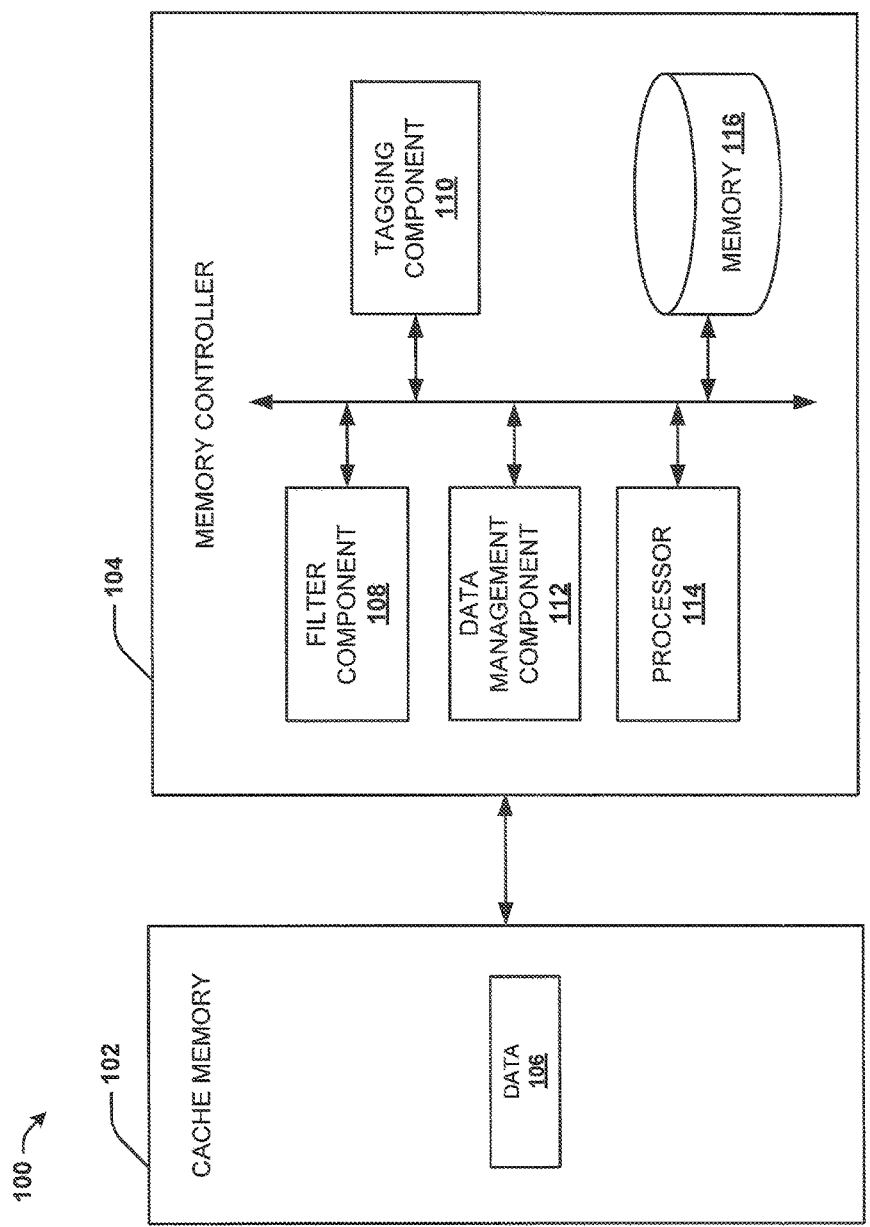
FIG. 1 is a block diagram illustrating an example, non-limiting embodiment of a memory system in accordance with various aspects described herein.

The disclosure herein is described with reference to the drawings, wherein like reference numerals are used to refer to like elements throughout. In the following description, for purposes of explanation, numerous specific details are set forth in order to provide a thorough understanding of the subject innovation. It may be evident, however, that various disclosed aspects can be practiced without these specific details. In other instances, well-known structures and devices are shown in block diagram form in order to facilitate describing the subject innovation.

Various aspects of the present disclosure provide for managing data associated with a cache memory. For example, data in a cache memory can be replaced and/or maintained based on a history profile of the data in the cache memory. In an aspect, a Bloom filter can be employed as a history mechanism to manage the data in the cache memory. For example, the Bloom filter can identify and/or mark recurrent data (e.g., egressed data due to a read hit or an eviction, and then re-inserted back into the cache memory) via a static insertion policy. In another aspect, data with implicit spatial and/or temporal locality can be maintained in the cache memory rather than being evicted from the cache memory (e.g., a reusable dataset is retained in the cache memory when exposed to scanning and thrashing). As such, data retained in the cache memory can be more resistant to eviction given the temporal locality of the data. Additionally, a tagging mechanism can be employed based on information provided by the Bloom filter. Therefore, reusable data can be retained in the cache memory by exploiting the tagging mechanism and the history mechanism associated with the Bloom filter. In yet another aspect, an adaptable mechanism (e.g., a dynamic insertion policy) can be additionally or alternatively employed. The adaptable mechanism can manage the data in the cache memory based on an amount of time in which the data resides in the cache memory. Accordingly, higher hit rates, improved performance and lower power consumption for the cache memory can be achieved. Moreover, resistance to scanning and thrashing of the cache memory can be achieved.

Turning now to FIG. 1, a block diagram illustrating an example, non-limiting embodiment of a system 100 in accordance with various aspects described herein is shown. The system 100 can be a memory system that includes a cache memory 102 and a memory controller 104. In one example, the system 100 can be associated with a central processing system and/or a multiprocessor system (e.g., a symmetric multiprocessor system, a simultaneous multiprocessing system, a chip multiprocessor system, etc.).

The cache memory 102 can be configured to store data 106. The data 106 can be, for example, a copy of data from a different memory location (e.g., a main memory, another cache memory associated with a central processing unit, etc.) and/or frequency used data by a processor (e.g., a central processing unit). In another example, the data 106 can be instruction data and/or program data. In yet another example, the data 106 can be audio processing data, video processing data, communication data and/or other data. However, it is to be appreciated that the data 106 can be other data stored in the cache memory 102. The data 106 can be associated with a data block of the cache memory 102. It is to be appreciated that other data can also be stored in the cache memory 102 (e.g., other data can be stored in other data blocks of the cache memory 102). In one example, the cache memory 102 can be a Level-3 cache. The cache memory 102 can also be, for example, a victim cache memory (e.g., a last-level cache memory) that stores data (e.g., the data 106) evicted from a central processing unit cache (e.g., a main cache). In a non-limiting example, the cache memory 102 can be a 64 kbit bit-addressable memory. However, it is to be appreciated that the cache memory 102 can be a different type of cache memory.

The memory controller 104 can be coupled to the cache memory 102. The memory controller 104 can control queuing, data insertions, data evictions, and/or other functionalities associated with the cache memory 102 (e.g., the memory controller 104 can be a cache controller). Furthermore, the memory controller 104 can maintain a history profile for the data 106 and/or other data stored in the cache memory 102. The memory controller 104 can employ the history profile for the data 106 and/or the other data stored in the cache memory 102 to manage the data 106 and/or the other data stored in the cache memory 102. For example, the data 106 can be removed from the cache memory 102 and/or maintained in the cache memory 102 based on the history profile for the data 106. In an aspect, the memory controller 104 can include a filter component 108, a tagging component 110 and a data management component 112. Aspects of the systems, apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. For example, in an implementation, the filter component 108, the tagging component 110 and/or the data management component 112 can constitute machine-executable component(s) embodied within the memory controller 104. Furthermore, the system 100 and/or the memory controller 104 can include memory 116 for storing computer executable components and instructions. The system 100 and/or the memory controller 104 can further include a processor 114 to facilitate operation of the instructions (e.g., computer executable components and instructions) by the system 100 and/or the memory controller 104.

The filter component 108 can determine whether the data 106 is previously stored in the cache memory 102 based on a filter associated with a probabilistic data structure. The filter associated with the probabilistic data structure can be associated with a history profile for the data 106. For example, the filter component 108 can determine whether the data 106 is previously stored in the cache memory 102 based on a Bloom filter (e.g., the Bloom filter can identify previously stored data in the cache memory 102). In an aspect, the tagging component 110 can tag the data 106 as recurrent data (e.g., previously stored data in the cache memory 102) in response to a determination by the filter component 108 that the data 106 is previously stored in the cache memory 102. For example, the tagging component 110 can tag the data 106 as recurrent data in response to a determination by the Bloom filter that the data 106 is previously stored in the cache memory 102. The data management component 112 can retain the data 106 in the cache memory 102 in response to the tagging of the data 106 as the recurrent data.

In another aspect, the tagging component 110 can tag the data 106 as non-recurrent data in response to a determination by the filter component 108 that the data 106 is not previously stored in the cache memory 102. For example, the tagging component 110 can tag the data 106 as non-recurrent data in response to a determination by the Bloom filter that the data 106 is not previously stored in the cache memory 102. The data management component 112 can remove the data 106 from the cache memory 102 in response to the tagging of the data 106 as the non-recurrent data.

In yet another aspect, the tagging component 110 can randomly tag the data 106 as the recurrent data in response to a determination by the filter component 108 that the data 106 is not previously stored in the cache memory 102. For example, the tagging component 110 can randomly tag the data 106 as the recurrent data in response to a determination by the Bloom filter that the data 106 is not previously stored in the cache memory 102. As such, a subset of data identified by the filter component 108 as recurrent data can still be removed from the cache memory 102.

Accordingly, the tagging component 110 can classify and/or manage historical information associated with the data 106 based on information provided by the filter component 108 (e.g., based on information provided by the filter associated with the filter component 108). The tagging component 110 can additionally employ an "age" mechanism to tag the data 106. The "age" mechanism employed by the tagging component 110 can define a current age of the data 106 in the cache memory 102. For example, the tagging component 110 can additionally tag the data 106 based on a period of time that the data 106 is stored in the cache memory 102. Furthermore, the data management component 112 can retain the data 106 in the cache memory 102 in response to the tagging of the data 106 as the recurrent data and a determination that the period of time satisfies a defined criterion. For example, the data management component 112 can retain the data 106 in the cache memory 102 in response a determination that the data 106 is recurrent data and the data 106 has not been stored in the cache memory 102 for a certain period of time. However, in an aspect, the data management component 112 can remove the data 106 from the cache memory 102 in response to the tagging of the data 106 as the recurrent data and a determination that the period of time satisfies another defined criterion. For example, the data management component 112 can remove the data 106 from the cache memory 102 in response a determination that the data 106 is recurrent data and the data 106 is stored in the cache memory 102 for a certain period of time. Additionally, the tagging component 110 can determine whether to retain the data 106 in the cache memory 102 based on a number of times that the data 106 is evicted (e.g., a number of times that the data 106 is evicted during a certain period of time).

In certain implementations, the data management component 112 can select the data 106 for eviction from the cache memory 102 based on a set of defined scenarios (e.g., a set of defined rules, a set of prioritized cases, etc.). For example, the data management component 112 can select the data 106 for eviction from the cache memory 102 if one or more data blocks of the cache memory 102 are invalid (e.g., a first defined scenario), if all data blocks of the cache memory 102 are valid and one or more data blocks of the cache memory 102 are old and have non-recurrent marked data (e.g., a second defined scenario), if all data blocks of the cache memory 102 and one or more data blocks of the cache memory 102 (e.g., a third defined scenario), if all data blocks of the cache memory 102 are valid and young, and one or more data blocks of the cache memory 102 have non-recurrent marked data (e.g., a fourth defined scenario), or if all data blocks of the cache memory 102 are valid and young, and all data blocks of the cache memory 102 have recurrent marked data (e.g., a fifth defined scenario). Furthermore, for each defined scenario from the set of defined scenarios, the data 106 can be selected based on a counter (e.g., a "pseudo random" replacement counter) which counts wrap-around and is incremented when a data block of the cache memory 102 is replaced. Alternatively, for each defined scenario from the set of defined scenarios, the data 106 can be selected by selecting a data block of the cache memory 102 when a lowest invalid data block of the cache memory 102 is selected for eviction (e.g., replacement) from the cache memory 102, when a lowest old non-recurrent data block of the cache memory 102 is selected for eviction (e.g., replacement) from the cache memory 102, when a lowest old data block of the cache memory 102 is selected for eviction (e.g., replacement) from the cache memory 102, when a lowest data block of the cache memory 102 with non-recurrent marked data is evicted (e.g., replaced) from the cache memory 102, or when a random counter selects data block of the cache memory 102 to be evicted (e.g., replaced) from the cache memory 102.

Figure 2:
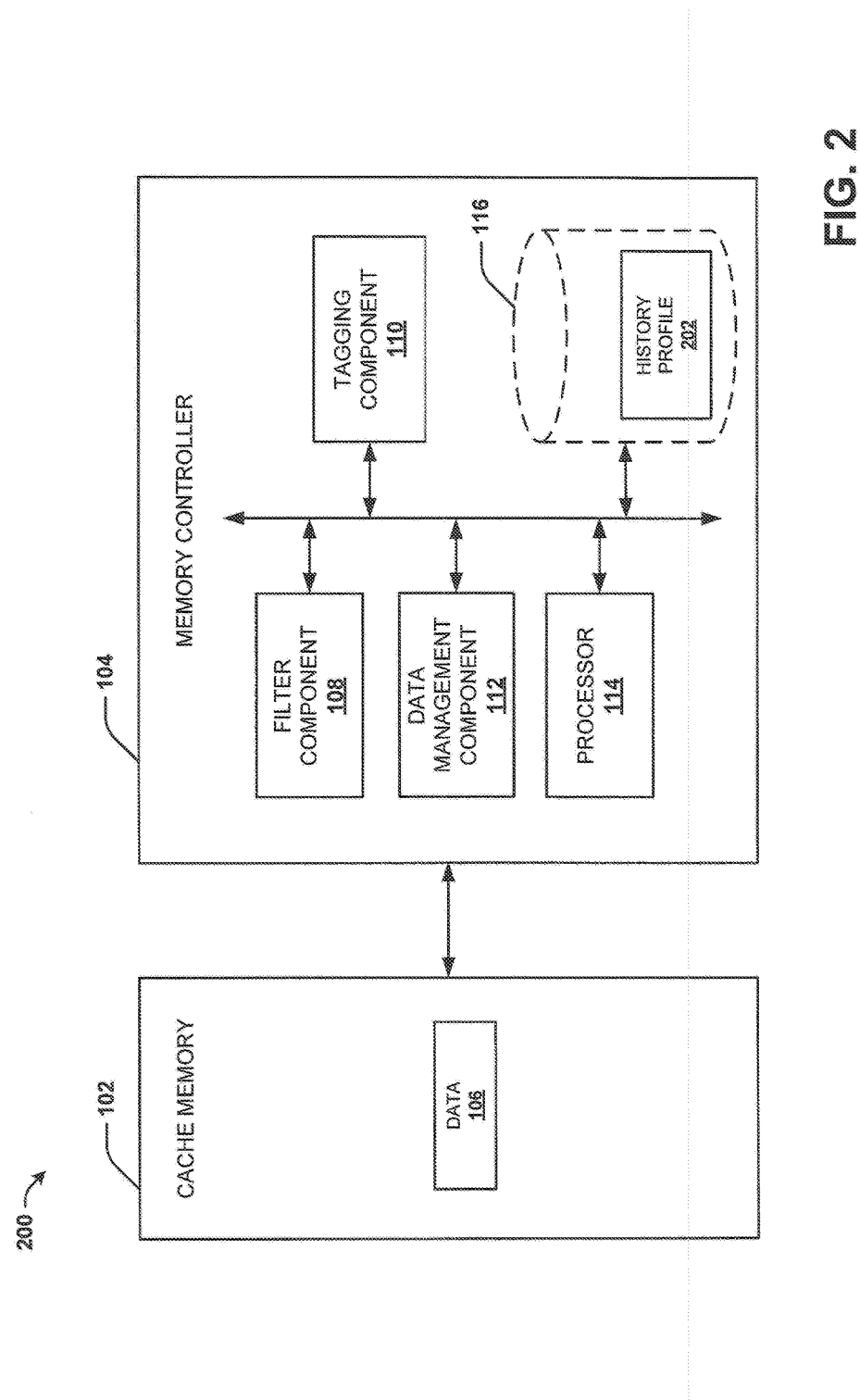
FIG. 2 is a block diagram illustrating another example, non-limiting embodiment of a memory system in accordance with various aspects described herein.

Referring now to FIG. 2, a block diagram illustrating an example, non-limiting embodiment of a system 200 in accordance with various aspects described herein is shown. System 200 includes the cache memory 102 and the memory controller 104. The memory controller 104 includes the filter component 108, the tagging component 110, the data management component 112, the processor 114, and/or the memory 116. In the embodiment shown in FIG. 2, the memory controller 104 can store and/or maintain a history profile 202 for the data 106 stored in the cache memory 102. In one example, the history profile 202 can be stored in the memory 116. However, it is to be appreciated that the history profile 202 can be stored in a different memory included in the memory controller 104 and/or coupled to the memory controller 104. The memory controller 104 can control queuing, data insertions, data evictions, and/or other functionalities associated with the cache memory 102 based on the history profile 202. The history profile 202 can be associated with the data 106 and/or other data stored in the cache memory 102. Therefore, the memory controller 104 can employ the history profile 202 to manage the data 106 and/or the other data stored in the cache memory 102.

The history profile 202 can maintain tagging information associated with the data 106 (e.g., tagging information determined by the tagging component 110 based on the filter associated with the filter component 108). For example, the history profile 202 can indicate whether the data 106 is considered recurrent data or non-recurrent data. Additionally, the history profile 202 can indicate age information associated with the data 106 (e.g., a length of time in which the data 106 is stored in the cache memory 102, whether the data 106 is considered "old" or "young", whether the data 106 is considered stale data, etc.). In one example, the data 106 can be removed (e.g., evicted) from the cache memory 102 and/or maintained in (e.g., reinserted into) the cache memory 102 based on information included in the history profile 202.

In an aspect, the history profile 202 can facilitate a static insertion policy for the cache memory 102. Furthermore, the history profile 202 can be employed by the memory controller 104 to track, detect and/or mark egressed data which is reinserted into the cache memory 102. For example, if the tagging component 110 determines that the data 106 is potentially reusable (e.g., the data 106 is recurrent data), the history profile 202 can indicate that data 106 is recurrent data (e.g., a recurrent bit can be marked) when the data 106 is reinserted into the cache memory 102. Furthermore, the data 106 can be given retention priority when a replacement victim selection is performed with respect to the cache memory 102. The history profile 202 can be managed based on information provided by the filter component 108. In one example, the history profile 202 can be managed based on a Bloom filter.

In an implementation, the tagging component 110 can maintain a counter (e.g., an egression counter) to keep track of a total number of egressions determined by the filter component 108 (e.g., determined by the Bloom filter). The tagging component 110 can employ the total number of egressions to determine when the filter (e.g., the Bloom filter) associated with the filter component 108 should be reset (e.g., when data associated with the filter should be cleared). For example, the tagging component 110 can erase information associated with the filter of the filter component 108 in response to a determination that the total number of egressions has reached a defined threshold level. Additionally, the tagging component 110 can reset the counter in response to the determination that the total number of egressions has reached a defined threshold level.

The history profile 202 can additionally or alternatively facilitate a dynamic insertion policy for the cache memory 102. For example, the data 106 can be marked as recurrent data even if the data 106 is not associated with a cache hit. In one example, the data management component 112 can select between employing the static insertion policy and the dynamic insertion policy for the data 106 based on a hit/miss ratio associated with the data 106. In an aspect, the data management component 112 can employ a programmable size policy selection counter that tracks number of hits and number of misses associated with the cache memory 102. The programmable size policy selection counter can be incremented on hits and decremented on misses.

Figure 3:
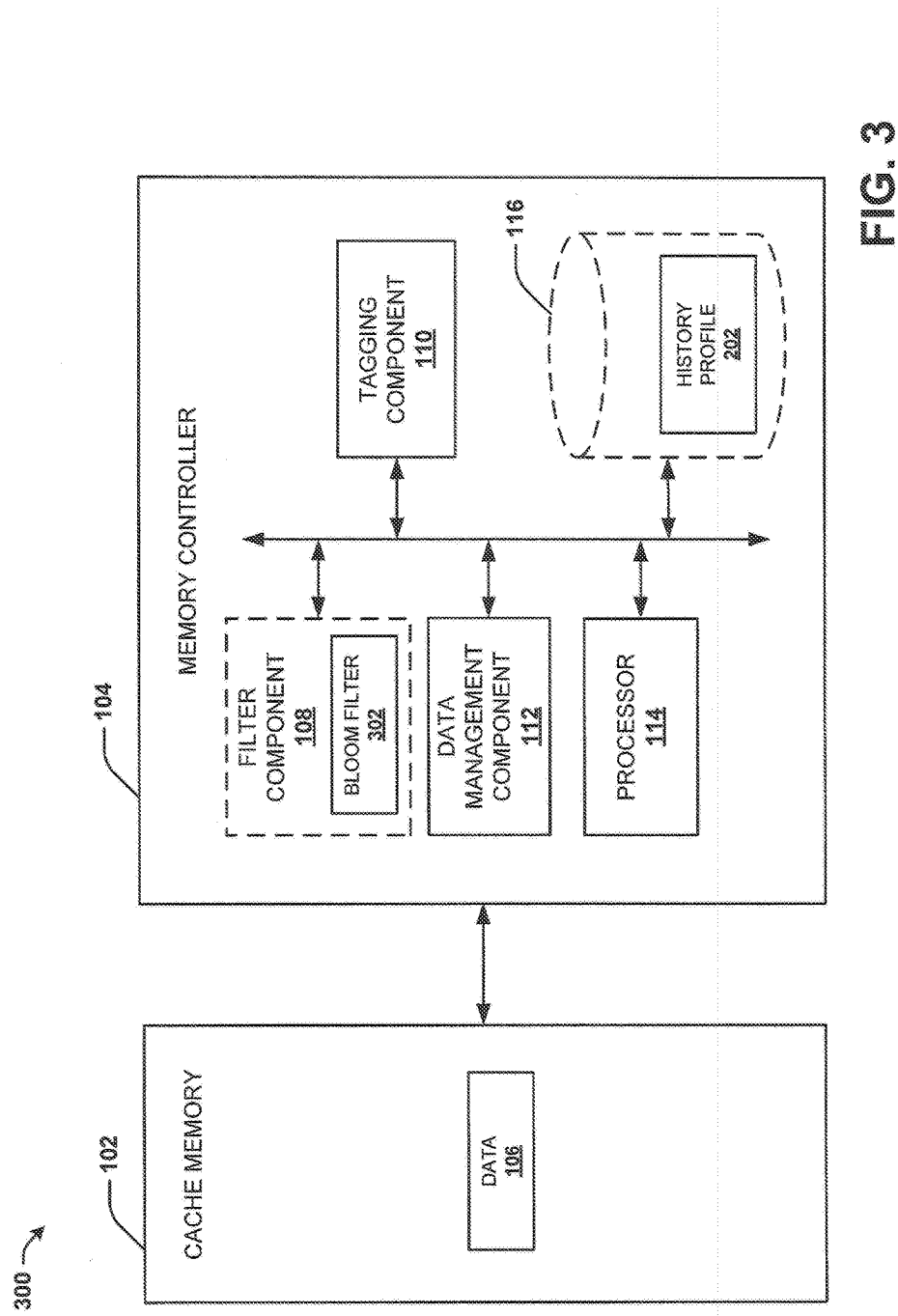
FIG. 3 is a block diagram illustrating yet another example, non-limiting embodiment of a memory system in accordance with various aspects described herein.

Referring now to FIG. 3, a block diagram illustrating an example, non-limiting embodiment of a system 300 in accordance with various aspects described herein is shown. System 300 includes the cache memory 102 and the memory controller 104. The memory controller 104 includes the filter component 108, the tagging component 110, the data management component 112, the processor 114, and/or the memory 116. The memory controller 104 can store and/or maintain the history profile 202. Furthermore, the filter component 108 can include and/or employ a Bloom filter 302. The Bloom filter 302 can be a probabilistic data structure. The Bloom filter 302 can be employed by the filter component 108 to test whether the data 106 is recurrent data (e.g., data previously stored in the cache memory 102) or non-recurrent data (e.g., data that is not previously stored in the cache memory 102). In one example, the Bloom filter 302 can be associated with a set of hash functions, where each hash function maps data (e.g., the data 106) to an array position of the Bloom filter 302 with a uniform random distribution. The array positions of the Bloom filter 302 can represent, for example, previously stored data in the cache memory 102. Therefore, a hash function can map the data 106 array positions of the Bloom filter 302 to determine whether the data 106 is previously stored data (e.g., to determine data that was previously stored in the cache memory 102). In an implementation, the Bloom filter 302 can be addressed with a hash of a line address of the cache memory 102. Furthermore, the Bloom filter 302 can be organized on a bit per line basis. As such, the Bloom filter 302 can allocate (e.g., set) a bit on data egressions from the cache memory 102, and the Bloom filter 302 can be read on incoming writes to the cache memory 102 (e.g., Level-2 cache evictions).

In an aspect, the memory controller 104 can maintain the history profile 202 for the data 106 stored in the cache memory 102 based on the Bloom filter 302. Additionally, the memory controller 104 can determine whether or not to remove the data 106 from the cache memory based on the history profile 202 (e.g., the history profile 202 that is managed based on the Bloom filter 302) and/or an amount of time in which the data 106 is stored in the cache memory 102. In another aspect, the memory controller 104 can tag the data 106 in the history profile 202 as recurrent data in response to a determination, based on the Bloom filter 302, that the data 106 is previously stored in the cache memory 102. In one example, the memory controller 104 can randomly tag the data 106 in the history profile 202 as recurrent data in response to a determination, based on the Bloom filter 302, that the data 106 is previously stored in the cache memory 102. In another aspect, the memory controller 104 can tag the data 106 in the history profile 202 as non-recurrent data in response to a determination, based on the Bloom filter 302, that the data 106 is not previously stored in the cache memory 102. In yet another aspect, the data management component 112 can filter data in the cache memory 102 based on the Bloom filter 302. For example, in response to certain criteria associated with the cache memory 102, the data management component 112 can filter data in the cache memory 102 using the Bloom filter 302.

In an implementation, the tagging component 110 can employ a first tag and a second tag for the data 106 based on the Bloom filter 302. The first tag can be, for example, a first tag bit (e.g., recurrent (R)) and the second tag can be, for example, a second tag bit (e.g., generation (G)). The first tag can indicate whether or not the data 106 is considered recurrent data. The second tag can indicate a length of time that the data 106 is stored in the cache memory 102 (e.g., whether the data 106 is "old" data or "young" data). Additionally, in certain implementations, the tagging component 110 can employ a third tag based on the Bloom filter 302. The third tag can be, for example, a Global Generation (GG) bit. The third tag can be employed to indicate a length of time in which all data in the cache memory 102 (e.g., the data 106 and other data) is stored in the cache memory 102 (e.g., whether all data in the cache memory 102 is "old" data or "young" data). In one example, the first tag, the second tag and/or the third tag can be stored in the history profile 202.

In a non-limiting example, at a time zero, the Bloom filter 302 can be empty and the third tag can be initialized to zero (e.g., the GG bit can be equal to zero). Over time, the cache memory 102 can be filled with data. Data written to the cache memory 102 can be marked with G=GG and R=Bloomfilter lookup. As data is read from the cache memory 102 (e.g., on cache hits) and evicted from the cache memory 102, the Bloom filter 302 can be updated (e.g., bit set==1) based on an address of the read data and the evicted data associated with the cache memory 102. If the same data (e.g., same address) is reinserted into the cache memory 102, the data management component 112 can determine that the data is reusable and should be retained in the cache memory 102 (e.g., should be given retention priority on eviction victim selection). The filter component 108 can detect reusable data via the Bloom filter 302. The filter component 108 can read the Bloom filter 302 at reinsertion, and if the Bloom filter 302 reads a "1", the filter component 108 can determine that the data is reusable data. Accordingly, the tagging component 110 can update the first tag to indicate that the data is reusable data (e.g., the R bit can be set to "1"). Accordingly, a replacement algorithm employed by the data management component 112 can distinguish reusable data from non-reusable data based on the Bloom filter 302. Therefore, data scanning and/or data accesses associated with the cache memory 102 can be improved by employing the Bloom filter 302.

The third tag (e.g., the GG bit) can be also employed to determine and/or indicate an amount of time in which the data 106 is stored in the cache memory 102 (e.g., the third tag can indicate an "age" of the data 106). For example, data marked with the first tag (e.g., the R bit) can become stale, leading to the cache memory 102 being filled with data (e.g., useless data) that is not relevant to another device (e.g., a central processing unit). Therefore, the second tag (e.g., the G bit) can be employed in combination with the third tag (e.g., the GG bit). In one example, a first value of the third tag (e.g., GG bit='0') can indicate that an amount of time in which the data 106 is stored in the cache memory 102 has not reached a defined threshold level (e.g., the data 106 is "young"). Furthermore, a second value of the third tag (e.g., GG bit='1') can indicate that an amount of time in which the data 106 is stored in the cache memory 102 has reached a defined threshold level (e.g., the data 106 is "old"). In another example, if a first value of the third tag (e.g., GG bit='0') is altered to a second value of the third tag (e.g., GG bit='1'), all G=0 marked data in the cache memory 102 can be tagged as "old" data.

As such, a replacement algorithm of the data management component 112 can prioritize replacement of "old" data over data associated with the first tag (e.g., R marked data). Furthermore, data associated with the first tag (e.g., R marked data) that is still in-use by the cache memory 102 can be read and reentered into the cache memory 102 as "young" data. Therefore, such data will not be evicted from the cache memory 102, but will be retained in the cache memory 102. In contrast, stale R marked data can remain marked as "old" data since such data is not read and reentered as "young" data. Therefore, such data will be removed (e.g., evicted) from the cache memory 102.

In an aspect, the Bloom filter 302 can be employed to determine whether the data 106 is associated with the first tag, the second tag and/or the third tag. In one example, the tagging component 110 can update the first tag, the second tag and/or the third tag associated with the data 106 (e.g., the first tag, the second tag and/or the third tag stored in the history profile 202) when the data 106 is inserted into and/or removed from the cache memory 102. For example, the first tag (e.g., the R bit) can be read from the Bloom filter 302 on data insertions. On data insertions where an addressed data set is full, the first tag (e.g., the R bit) can be read from each data block of the cache memory 102 and/or can be employed in a priority scheme to determine which data block of the cache memory 102 should be selected for eviction from the cache memory 102. Data blocks of the cache memory 102 that are associated with the first tag (e.g., data blocks of the cache memory 102 with an R bit set) can be prioritized for retention in the cache memory 102 over other data blocks of the cache memory 102 that are not associated with the first tag (e.g., other data blocks of the cache memory 102 without an R bit set). In another aspect, an eviction counter with a defined threshold level can be employed to determine when the third tag should be altered (e.g., to determine when to flip the GG bit). The eviction counter can be incremented for the data 106 each time the data 106 is evicted from the cache memory 102. When the eviction counter reaches the defined threshold level, the third tag can be altered (e.g., the GG bit can be set to "1") and the eviction counter can be reset.

Figure 4:
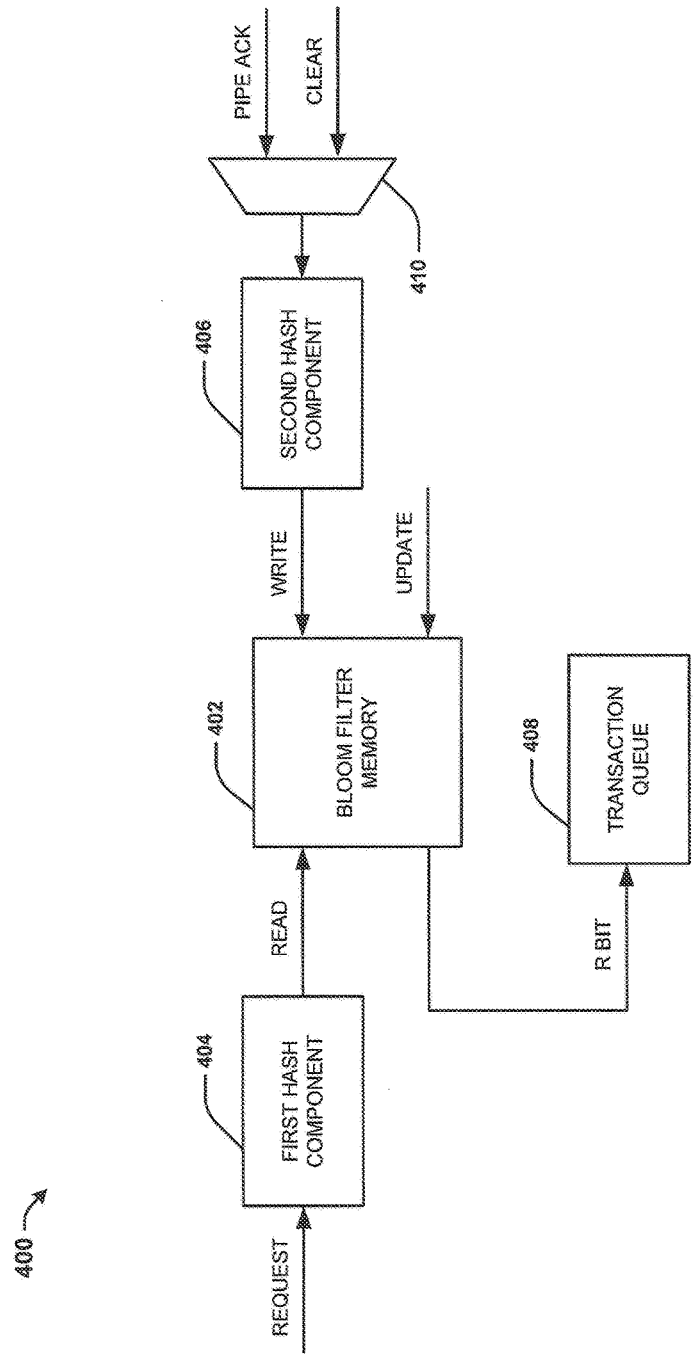
FIG. 4 is a block diagram illustrating logic implemented in a memory system in accordance with various aspects described herein.

Referring now to FIG. 4, a block diagram illustrating an example, non-limiting embodiment of a system 400 in accordance with various aspects described herein is shown. The system 400 can illustrate logic of the memory controller 104 with respect to the filter component 108, the tagging component 110 and/or the data management component 112. The system 400 includes a Bloom filter memory 402, a first hash component 404, a second hash component 406, a transaction queue 408 and a multiplexer 410. The Bloom filter memory 402 can be, for example, a Bloom filter random-access memory (RAM). For example, the Bloom filter memory 402 can be a memory for the Bloom filter 302. In another example, the Bloom filter memory 402 can be associated with and/or can correspond to the history profile 202.

In an implementation, the Bloom filter memory 402 can be a two-ported RAM with a write per bit capability. For example, the Bloom filter memory 402 can include a write port and a read port. The write port of the Bloom filter memory 402 can be employed on egressions where a bit of the Bloom filter memory 402 is set based on a hash of the egression address, and on clearing of the Bloom filter memory 402. The read port of the Bloom filter memory 402 can be employed on Level-2 cache memory write-backs where the Bloom filter memory 402 is read to determine if the Level-2 cache memory write back data is potentially recurrent. Access time of the Bloom filter memory 402 (e.g., an amount of time to write data to the Bloom filter memory 402 and/or an amount of time to read data to the Bloom filter memory 402) can be less than a cycle of the cache memory 102. In an aspect, the write port of the Bloom filter memory 402 and the read port of the Bloom filter memory 402 can be connected with a hash function. For example, the read port of the Bloom filter memory 402 can be connected to the first hash component 404 and the write port of the Bloom filter memory 402 can be connected to the second hash component 406.

In a non-limiting example, a request (e.g., REQUEST shown in FIG. 4) can be received by the first hash component 404. The request received by the first hash component 404 can be an incoming request for the Bloom filter memory 402. Furthermore, the request received by the first hash component 404 can be associated with the data 106. The incoming request for the Bloom filter memory 402 can be temporarily stored in the transaction queue 408. For example, a recurrent bit (e.g., R BIT shown in FIG. 4) associated with the incoming request can be stored in the transaction queue 408. In an implementation, the recurrent bit can be inserted into the transaction queue 408 a single cycle after the incoming request is received by the first hash component 404. For example, the first hash component 404 can randomize an address associated with the request. Furthermore, the first hash component 404 can generate a read address (e.g., READ shown in FIG. 4) for the request. The read address for the request can be employed to lookup data in the Bloom filter memory 402. Then, the Bloom filter memory 402 can read the R bit and insert the R bit into the transaction queue 408. In an aspect, the Bloom filter memory 402 can be associated with an ordering mechanism.

The multiplexer 410 can receive a pipe acknowledgement (e.g., PIPE ACK shown in FIG. 4). The pipe acknowledgement can be a response from an operation associated with the data 106. For example, the pipe acknowledgement can indicate whether the data 106 is associated with a cache hit, whether the data 106 is associated with a cache miss, whether the data 106 is evicted from the cache memory 102, etc. The second hash component 406 can generate a write address (e.g., WRITE shown in FIG. 4) for the pipe acknowledgement. Therefore, the Bloom filter memory 402 can be updated based on the pipe acknowledgement (e.g., a bit of the Bloom filter memory 402 can be set if the pipe acknowledgement indicates that the data 106 is associated with a cache hit, etc.). When the egression counter reaches a defined threshold, data stored in the Bloom filter memory 402 can be cleared. In an aspect, the Bloom filter memory 402 can be cleared via a clear instruction (e.g., CLEAR shown in FIG. 4). Additionally, data of the Bloom filter memory 402 can be updated via an update instruction (e.g., UPDATE shown in FIG. 4). As such, the Bloom filter memory 402 facilitate maintaining a history profile for data associated with the cache memory 102.

Figure 5:
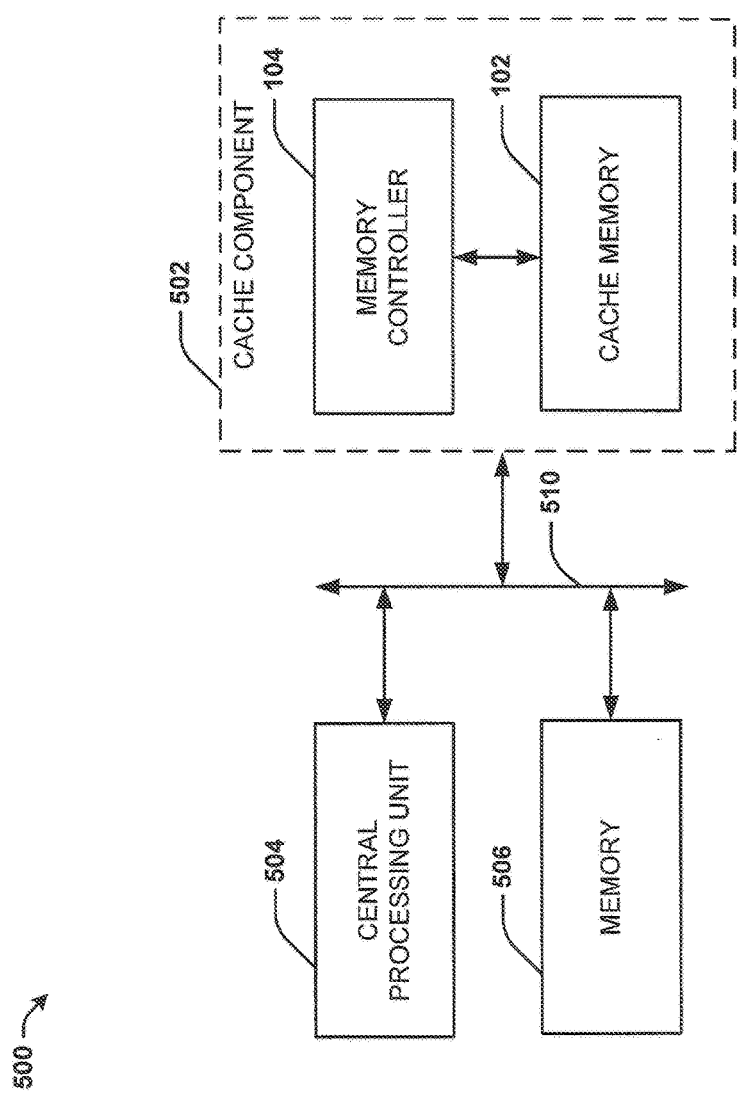
FIG. 5 is a block diagram illustrating an example, non-limiting embodiment of a central processing system in accordance with various aspects described herein.

Referring now to FIG. 5, a block diagram illustrating an example, non-limiting embodiment of a system 500 in accordance with various aspects described herein is shown. In one example, the system 500 can be a central processing system. In another example, the system 500 can be a multiprocessor system (e.g., a symmetric multiprocessor system, a simultaneous multiprocessing system, a chip multiprocessor system, etc.). The system 500 includes a cache component 502, a central processing unit 504 and a memory 506. The cache component 502 can correspond to the system 100, the system 200, the system 300 or the system 400. Accordingly, the cache component 502 can include the cache memory 102 and the memory controller 104. The cache memory 102 can be, for example, a cache memory for the central processing unit 504. The central processing unit 504 can include one or more processors (e.g., processor cores). In an implementation, the cache component 502 can be implemented separate from the central processing unit 504. In another implementation, the central processing unit 504 can include the cache component 502. Data stored in the cache memory 102 (e.g., the data 106) can be employed by the central processing unit 504. The cache component 502, the central processing unit 504 and/or the memory 506 can be in communication via a communication bus 510.

In an embodiment, the memory 506 can be a main memory associated with the central processing unit 504. A copy of data stored in the memory 506 can be stored in the cache memory 102. For example, a copy of a processor instruction (e.g., a processor instruction associated with the central processing unit 504) stored in the memory 506 can also be stored in the cache memory 102. In an embodiment, the memory 506 can be a cache memory (e.g., a main cache memory) associated with the central processing unit 504. For example, the cache memory 102 can be a victim cache memory (e.g., a last-level cache memory) that stores data (e.g., the data 106) evicted from the memory 506 associated with the central processing unit 504.

In view of the example systems described above, methods that may be implemented in accordance with the described subject matter may be better appreciated with reference to the flow charts of FIGS. 6-9. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Figure 6:
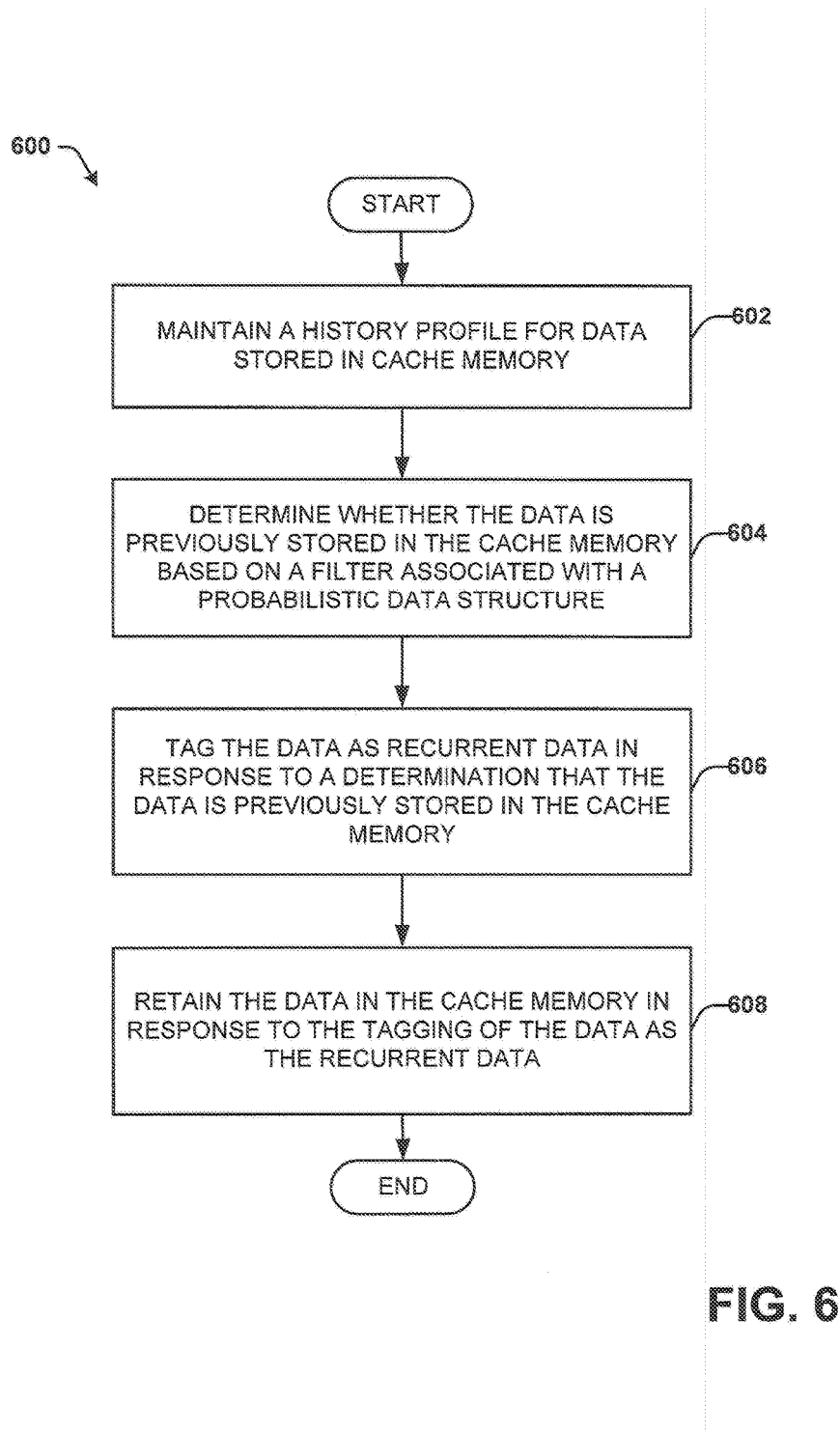
FIG. 6 illustrates a flow diagram of an example, non-limiting embodiment of a method for managing data for cache memory.

Referring to FIG. 6, a flow diagram of an example, non-limiting embodiment of a method 600 for managing data for cache memory is shown. Method 600 can be associated with a memory controller (e.g., the memory controller 104). Method 600 can begin at block 602, where a history profile for data stored in cache memory is maintained. For example, the history profile can indicate whether or not the data is previously stored in the cache memory, whether or not the data was previously a cache hit, whether or not the data was previously reused, how long the data has been stored in the cache memory, etc. At block 604, it is determined whether the data is previously stored in the cache memory based on a filter associated with a probabilistic data structure. For example, it can be determined whether or not the data is previously stored in the cache memory based on a Bloom filter. At block 606, the data is tagged as recurrent data in response to a determination that the data is previously stored in the cache memory. For example, the history profile can be updated to indicate that the data is recurrent data in response to a determination that the data is previously stored in the cache memory. At block 608, the data in the cache memory is retained in response to the tagging of the data as the recurrent data. For example, rather than being evicted from the cache memory, the data can be retained in the cache memory. In an aspect, at block 606, the data can be tagged based on a period of time that the data is stored in the cache memory. Furthermore, at block 608, the data can be retained in the cache memory based on the period of time.

Figure 7:
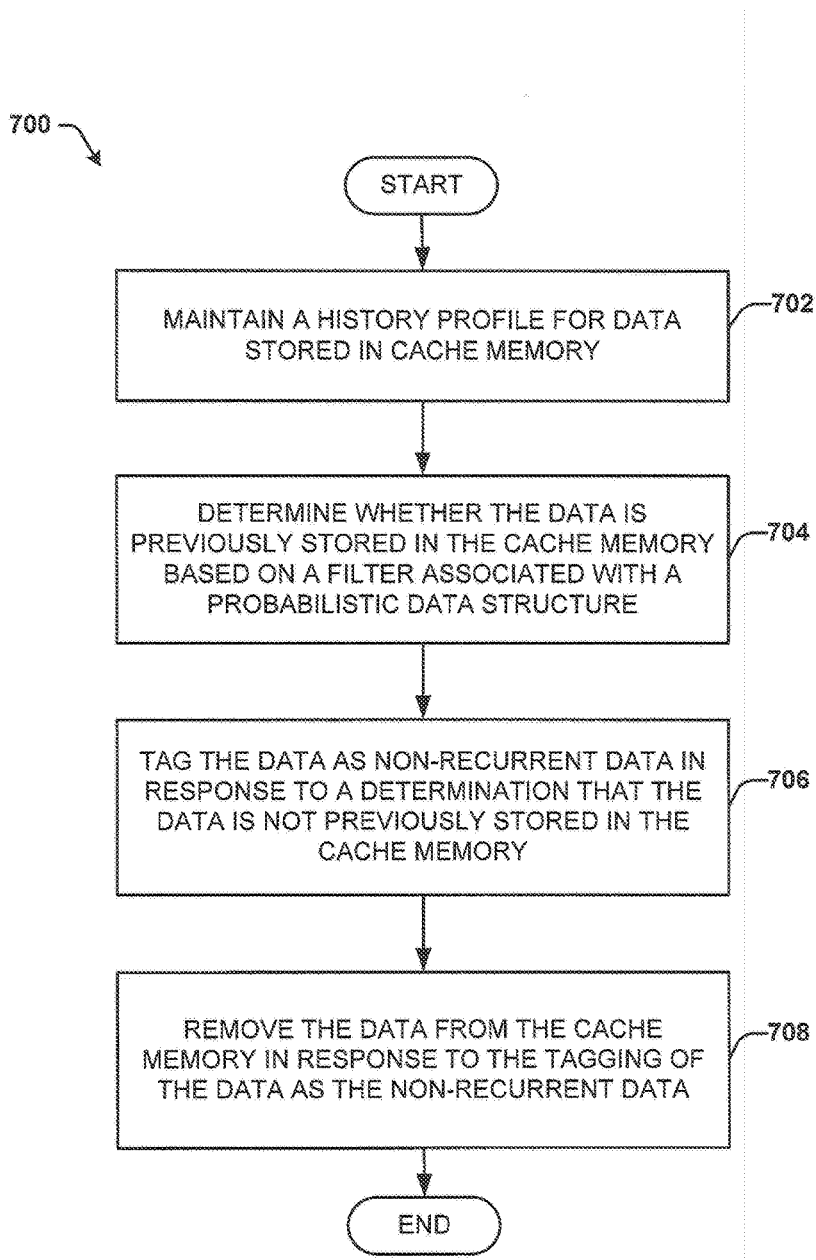
FIG. 7 illustrates a flow diagram of another example, non-limiting embodiment of a method for managing data for cache memory.

Referring to FIG. 7, a flow diagram of another example, non-limiting embodiment of a method 700 for managing data for cache memory is shown. Method 700 can be associated with a memory controller (e.g., the memory controller 104). Method 700 can begin at block 702, where a history profile for data stored in cache memory is maintained. For example, the history profile can indicate whether or not the data is previously stored in the cache memory, whether or not the data was previously a cache hit, whether or not the data was previously reused, how long the data has been stored in the cache memory, etc. At block 704, it is determined whether the data is previously stored in the cache memory based on a filter associated with a probabilistic data structure. For example, it can be determined whether or not the data is previously stored in the cache memory based on a Bloom filter. At block 706, the data is tagged as non-recurrent data in response to a determination that the data is not previously stored in the cache memory. For example, the history profile can be updated to indicate that the data is non-recurrent data in response to a determination that the data is not previously stored in the cache memory. At block 708, the data is removed from the cache memory in response to the tagging of the data as the non-recurrent data. For example, rather than retaining the data in the cache memory, the data can be evicted from the cache memory.

In an alternate implementation, the data can be randomly tagged as recurrent data in response to the determination that the data is not previously stored in the cache memory. Furthermore, the data can be retained in the cache memory in response to the tagging of the data as the recurrent data, rather than being removed from the cache memory.

Figure 8:
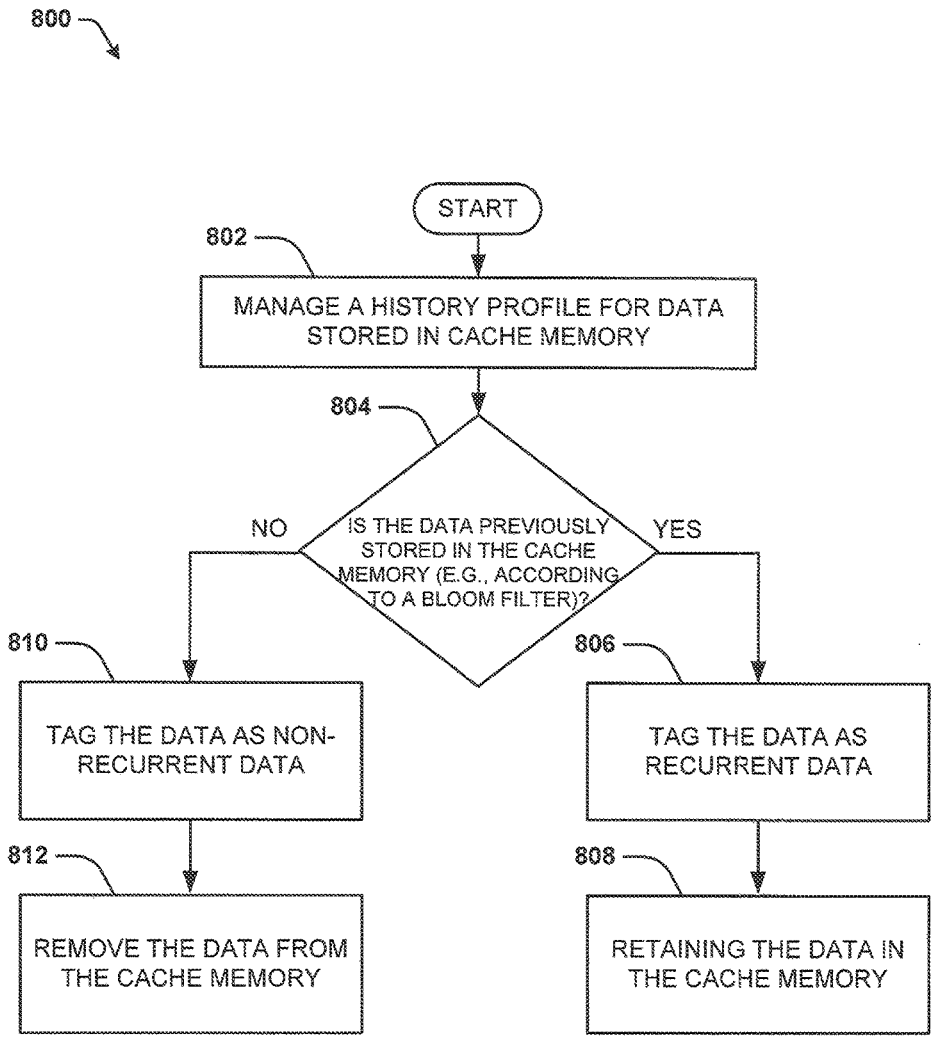
FIG. 8 illustrates a flow diagram of yet another example, non-limiting embodiment of a method for managing data for cache memory.

Referring to FIG. 8, a flow diagram of yet another example, non-limiting embodiment of a method 800 for managing data for cache memory is shown. Method 800 can be associated with a memory controller (e.g., the memory controller 104). Method 800 can begin at block 802, where a history profile for data stored in cache memory is managed. For example, a tag that indicates whether or not the data is recurrent data can be managed by the history profile and/or a tag that indicates an amount of time in which the data is stored in the cache memory (e.g., an "age" of the data stored in the cache memory) can be managed by the history profile. At block 804, it is determined whether the data previously stored in the cache memory by employing a Bloom filter. For example, the Bloom filter can map data in the cache memory that was previously identified as a cache hit. If yes, method 800 proceeds to block 806. At block 806, the data is tagged as recurrent data. For example, the history profile can be updated to indicate that the data is recurrent data. Then, at block 808, the data is retained in the cache memory. If no, method 800 proceeds to block 810. At block 810, the data is tagged as non-recurrent data. For example, the history profile can be updated to indicate that the data is non-recurrent data. Then, at block 812, the data is removed from the cache memory.

Figure 9:
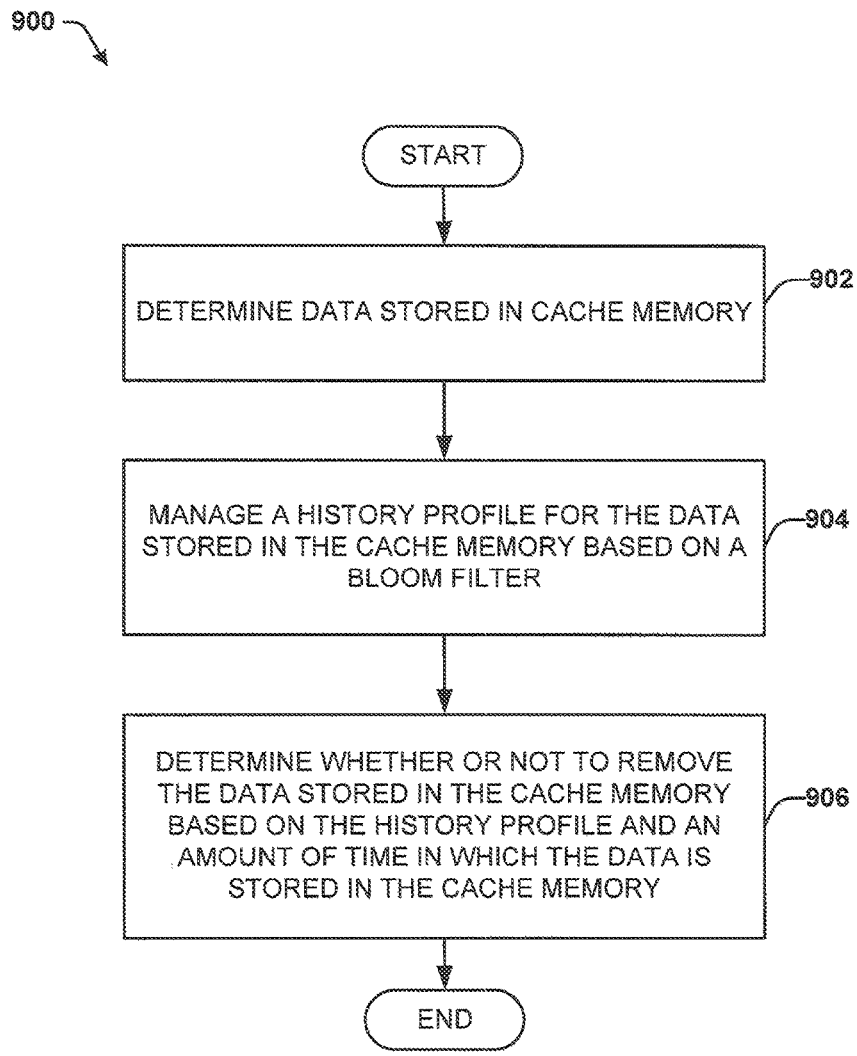
FIG. 9 illustrates a flow diagram of yet another example, non-limiting embodiment of a method for managing data for cache memory.

Referring to FIG. 9, a flow diagram of yet another example, non-limiting embodiment of a method 900 for managing data for cache memory is shown. Method 900 can be associated with a memory controller (e.g., the memory controller 104). Method 900 can begin at block 902, where data stored in cache memory is determined. For example, in response to a request to evict the data stored in the cache memory, the data can be identified. At block 904, a history profile for the data stored in the cache memory is managed based on a Bloom filter. For example, the history profile can indicate whether or not the data is previously stored in the cache memory based on the Bloom filter, whether or not the data was previously a cache hit based on the Bloom filter, whether or not the data was previously reused based on the Bloom filter, etc. At block 906, it is determined whether or not to remove the data stored in the cache memory based on the history profile and an amount of time in which the data is stored in the cache memory. In one example, the data can be retained in the cache memory in response to a determination that the data is recurrent data and the amount of time in which the data is stored in the cache memory has not reached a defined threshold level. In another example, the data can be removed (e.g., evicted) from the cache memory in response to a determination that the data is recurrent data and the amount of time in which the data is stored in the cache memory has reached a defined threshold level.

Example Computing Environment

Figure 10:
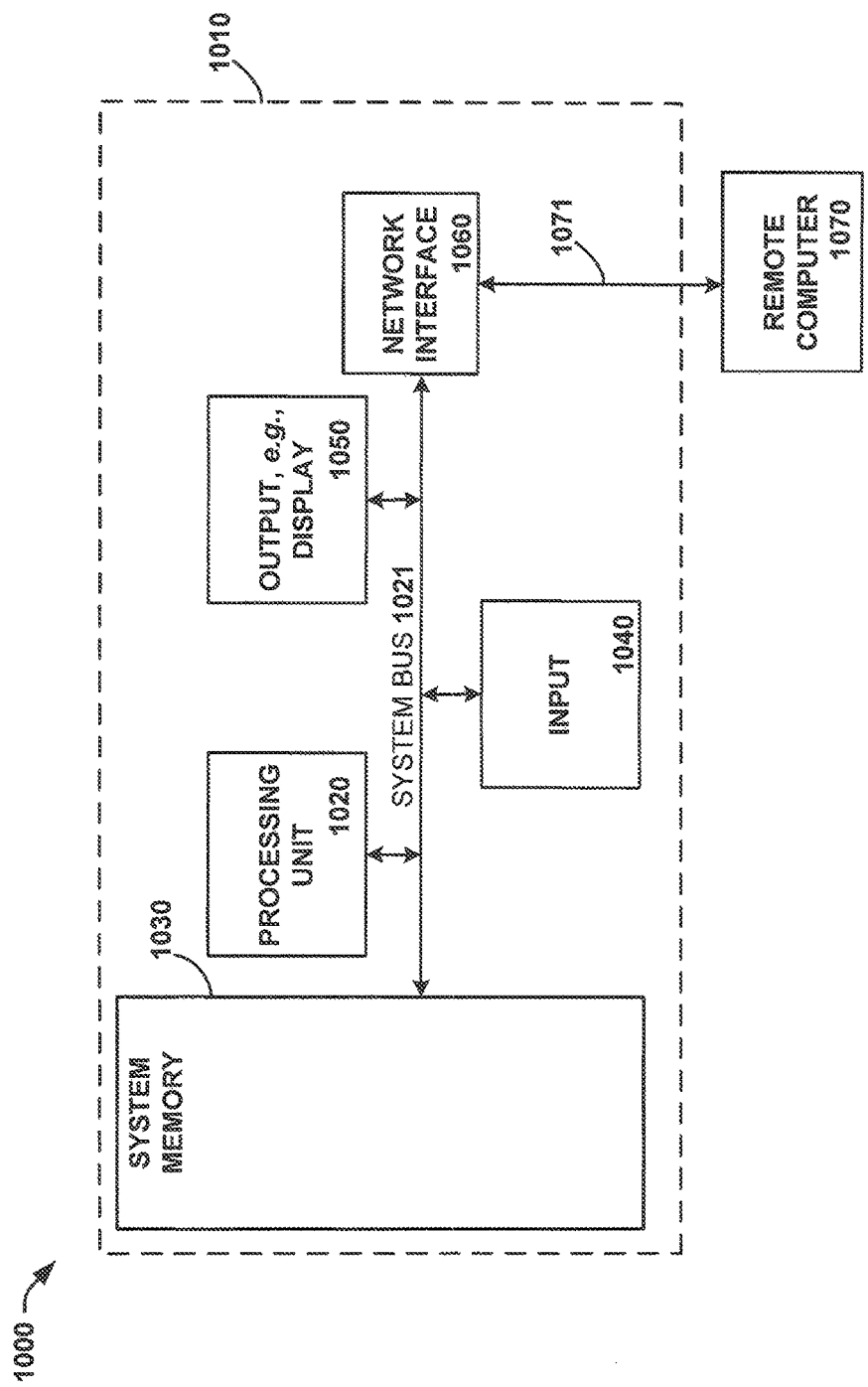
FIG. 10 illustrates a block diagram of an example electronic computing environment that can be implemented in conjunction with one or more aspects described herein.

As mentioned, advantageously, the techniques described herein can be applied to any device where it is desirable to manage data associated with cache memory. It is to be understood, therefore, that handheld, portable and other computing devices and computing objects of all kinds are contemplated for use in connection with the various non-limiting embodiments, i.e., anywhere that a device may wish to manage data associated with cache memory. Accordingly, the below general purpose remote computer described below in FIG. 10 is but one example, and the disclosed subject matter can be implemented with any client having network/bus interoperability and interaction. Thus, the disclosed subject matter can be implemented in an environment of networked hosted services in which very little or minimal client resources are implicated, e.g., a networked environment in which the client device serves merely as an interface to the network/bus, such as an object placed in an appliance.

Although not required, some aspects of the disclosed subject matter can partly be implemented via an operating system, for use by a developer of services for a device or object, and/or included within application software that operates in connection with the component(s) of the disclosed subject matter. Software may be described in the general context of computer executable instructions, such as program modules or components, being executed by one or more computer(s), such as projection display devices, viewing devices, or other devices. Those skilled in the art will appreciate that the disclosed subject matter may be practiced with other computer system configurations and protocols.

FIG. 10 thus illustrates an example of a suitable computing system environment 1000 in which some aspects of the disclosed subject matter can be implemented, although as made clear above, the computing system environment 1000 is only one example of a suitable computing environment for a device and is not intended to suggest any limitation as to the scope of use or functionality of the disclosed subject matter. Neither should the computing environment 1000 be interpreted as having any dependency or requirement relating to any one or combination of components illustrated in the exemplary operating environment 1000.

With reference to FIG. 10, an exemplary device for implementing the disclosed subject matter includes a general-purpose computing device in the form of a computer 1010. Components of computer 1010 may include, but are not limited to, a processing unit 1020, a system memory 1030, and a system bus 1021 that couples various system components including the system memory to the processing unit 1020. The system bus 1021 may be any of several types of bus structures including a memory bus or memory controller, a peripheral bus, and a local bus using any of a variety of bus architectures.

Computer 1010 typically includes a variety of computer readable media. Computer readable media can be any available media that can be accessed by computer 1010. By way of example, and not limitation, computer readable media can comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 1010. Communication media typically embodies computer readable instructions, data structures, program modules, or other data in a modulated data signal such as a carrier wave or other transport mechanism and includes any information delivery media.

The system memory 1030 may include computer storage media in the form of volatile and/or nonvolatile memory such as read only memory (ROM) and/or random access memory (RAM). A basic input/output system (BIOS), containing the basic routines that help to transfer information between elements within computer 1010, such as during start-up, may be stored in memory 1030. Memory 1030 typically also contains data and/or program modules that are immediately accessible to and/or presently being operated on by processing unit 1020. By way of example, and not limitation, memory 1030 may also include an operating system, application programs, other program modules, and program data.

The computer 1010 may also include other removable/non-removable, volatile/nonvolatile computer storage media. For example, computer 1010 could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. A hard disk drive is typically connected to the system bus 1021 through a non-removable memory interface such as an interface, and a magnetic disk drive or optical disk drive is typically connected to the system bus 1021 by a removable memory interface, such as an interface.

A user can enter commands and information into the computer 1010 through input devices such as a keyboard and pointing device, commonly referred to as a mouse, trackball, or touch pad. Other input devices can include a microphone, joystick, game pad, satellite dish, scanner, wireless device keypad, voice commands, or the like. These and other input devices are often connected to the processing unit 1020 through user input 1040 and associated interface(s) that are coupled to the system bus 1021, but may be connected by other interface and bus structures, such as a parallel port, game port, or a universal serial bus (USB). A graphics subsystem can also be connected to the system bus 1021. A projection unit in a projection display device, or a HUD in a viewing device or other type of display device can also be connected to the system bus 1021 via an interface, such as output interface 1050, which may in turn communicate with video memory. In addition to a monitor, computers can also include other peripheral output devices such as speakers which can be connected through output interface 1050.

The computer 1010 can operate in a networked or distributed environment using logical connections to one or more other remote computer(s), such as remote computer 1070, which can in turn have media capabilities different from computer 1010. The remote computer 1070 can be a personal computer, a server, a router, a network PC, a peer device, personal digital assistant (PDA), cell phone, handheld computing device, a projection display device, a viewing device, or other common network node, or any other remote media consumption or transmission device, and may include any or all of the elements described above relative to the computer 1010. The logical connections depicted in FIG. 10 include a network 1071, such local area network (LAN) or a wide area network (WAN), but can also include other networks/buses, either wired or wireless. Such networking environments are commonplace in homes, offices, enterprise-wide computer networks, intranets and the Internet.

When used in a LAN networking environment, the computer 1010 can be connected to the LAN 1071 through a network interface or adapter. When used in a WAN networking environment, the computer 1010 can typically include a communications component, such as a modem, or other means for establishing communications over the WAN, such as the Internet. A communications component, such as wireless communications component, a modem and so on, which can be internal or external, can be connected to the system bus 1021 via the user input interface of input 1040, or other appropriate mechanism. In a networked environment, program modules depicted relative to the computer 1010, or portions thereof, can be stored in a remote memory storage device. It will be appreciated that the network connections shown and described are exemplary and other means of establishing a communications link between the computers can be used.

Example Networking Environment

Figure 11:
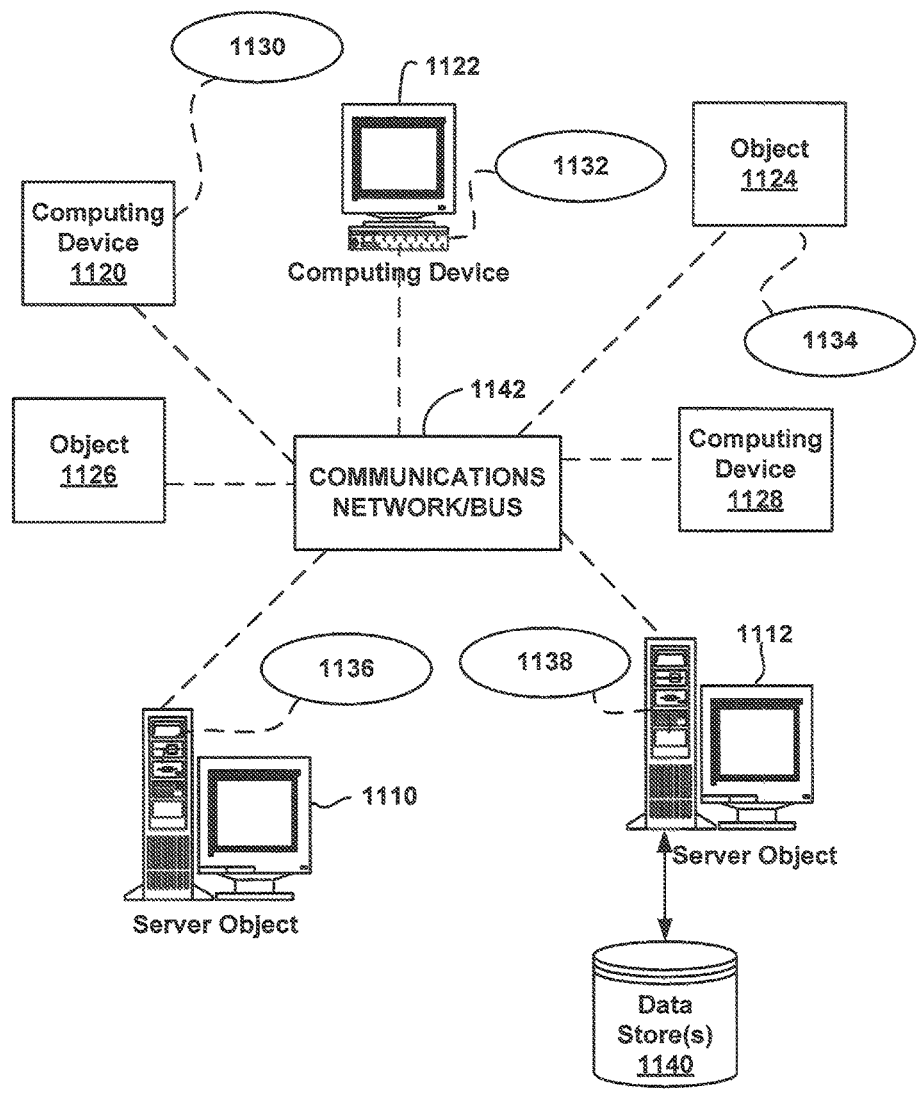
FIG. 11 illustrates a block diagram of an example data communication network that can be operable in conjunction with various aspects described herein.

FIG. 11 provides a schematic diagram of an exemplary networked or distributed computing environment. The distributed computing environment comprises computing objects 1110, 1112, etc. and computing objects or devices 1120, 1122, 1124, 1126, 1128, etc., which may include programs, methods, data stores, programmable logic, etc., as represented by applications 1130, 1132, 1134, 1136, 1138 and data store(s) 1140. It can be appreciated that computing objects 1110, 1112, etc. and computing objects or devices 1120, 1122, 1124, 1126, 1128, etc. may comprise different devices, including a multimedia display device or similar devices depicted within the illustrations, or other devices such as a mobile phone, personal digital assistant (PDA), audio/video device, MP3 players, personal computer, laptop, etc. It should be further appreciated that data store(s) 1140 can include memory or other similar data stores as disclosed herein.

Each computing object 1110, 1112, etc. and computing objects or devices 1120, 1122, 1124, 1126, 1128, etc. can communicate with one or more other computing objects 1110, 1112, etc. and computing objects or devices 1120, 1122, 1124, 1126, 1128, etc. by way of the communications network 1142, either directly or indirectly. Even though illustrated as a single element in FIG. 11, communications network 1142 may comprise other computing objects and computing devices that provide services to the system of FIG. 11, and/or may represent multiple interconnected networks, which are not shown. Each computing object 1110, 1112, etc. or computing object or devices 1120, 1122, 1124, 1126, 1128, etc. can also contain an application, such as applications 1130, 1132, 1134, 1136, 1138, that might make use of an API, or other object, software, firmware and/or hardware, suitable for communication with or implementation of the techniques and disclosure described herein.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications as described in various embodiments herein.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service, in some cases without having to "know" any working details about the other program or the service itself.

In a client/server architecture, particularly a networked system, a client is usually a computer that accesses shared network resources provided by another computer, e.g., a server. In the illustration of FIG. 11, as a non-limiting example, computing objects or devices 1120, 1122, 1124, 1126, 1128, etc. can be thought of as clients and computing objects 1110, 1112, etc. can be thought of as servers where computing objects 1110, 1112, etc., acting as servers provide data services, such as receiving data from client computing objects or devices 1120, 1122, 1124, 1126, 1128, etc., storing of data, processing of data, transmitting data to client computing objects or devices 1120, 1122, 1124, 1126, 1128, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network 1142 or bus is the Internet, for example, the computing objects 1110, 1112, etc. can be Web servers with which other computing objects or devices 1120, 1122, 1124, 1126, 1128, etc. communicate via any of a number of known protocols, such as the hypertext transfer protocol (HTTP). Computing objects 1110, 1112, etc. acting as servers may also serve as clients, e.g., computing objects or devices 1120, 1122, 1124, 1126, 1128, etc., as may be characteristic of a distributed computing environment.

Reference throughout this specification to "one embodiment," "an embodiment," "an example," "a disclosed aspect," or "an aspect" means that a particular feature, structure, or characteristic described in connection with the embodiment or aspect is included in at least one embodiment or aspect of the present disclosure. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in various disclosed embodiments.

As utilized herein, terms "component," "system," "engine," "architecture" and the like are intended to refer to a computer or electronic-related entity, either hardware, a combination of hardware and software, software (e.g., in execution), or firmware. For example, a component can be one or more transistors, a memory cell, an arrangement of transistors or memory cells, a gate array, a programmable gate array, an application specific integrated circuit, a controller, a processor, a process running on the processor, an object, executable, program or application accessing or interfacing with semiconductor memory, a computer, or the like, or a suitable combination thereof. The component can include erasable programming (e.g., process instructions at least in part stored in erasable memory) or hard programming (e.g., process instructions burned into non-erasable memory at manufacture).

By way of illustration, both a process executed from memory and the processor can be a component. As another example, an architecture can include an arrangement of electronic hardware (e.g., parallel or serial transistors), processing instructions and a processor, which implement the processing instructions in a manner suitable to the arrangement of electronic hardware. In addition, an architecture can include a single component (e.g., a transistor, a gate array, . . . ) or an arrangement of components (e.g., a series or parallel arrangement of transistors, a gate array connected with program circuitry, power leads, electrical ground, input signal lines and output signal lines, and so on). A system can include one or more components as well as one or more architectures. One example system can include a switching block architecture comprising crossed input/output lines and pass gate transistors, as well as power source(s), signal generator(s), communication bus(ses), controllers, I/O interface, address registers, and so on. It is to be appreciated that some overlap in definitions is anticipated, and an architecture or a system can be a stand-alone component, or a component of another architecture, system, etc.

In addition to the foregoing, the disclosed subject matter can be implemented as a method, apparatus, or article of manufacture using typical manufacturing, programming or engineering techniques to produce hardware, firmware, software, or any suitable combination thereof to control an electronic device to implement the disclosed subject matter. The terms "apparatus" and "article of manufacture" where used herein are intended to encompass an electronic device, a semiconductor device, a computer, or a computer program accessible from any computer-readable device, carrier, or media. Computer-readable media can include hardware media, or software media. In addition, the media can include non-transitory media, or transport media. In one example, non-transitory media can include computer readable hardware media. Specific examples of computer readable hardware media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Computer-readable transport media can include carrier waves, or the like. Of course, those skilled in the art will recognize many modifications can be made to this configuration without departing from the scope or spirit of the disclosed subject matter.

What has been described above includes examples of the subject innovation. It is, of course, not possible to describe every conceivable combination of components or methodologies for purposes of describing the subject innovation, but one of ordinary skill in the art can recognize that many further combinations and permutations of the subject innovation are possible. Accordingly, the disclosed subject matter is intended to embrace all such alterations, modifications and variations that fall within the spirit and scope of the disclosure. Furthermore, to the extent that a term "includes", "including", "has" or "having" and variants thereof is used in either the detailed description or the claims, such term is intended to be inclusive in a manner similar to the term "comprising" as "comprising" is interpreted when employed as a transitional word in a claim.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Additionally, some portions of the detailed description have been presented in terms of algorithms or process operations on data bits within electronic memory. These process descriptions or representations are mechanisms employed by those cognizant in the art to effectively convey the substance of their work to others equally skilled. A process is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise or apparent from the foregoing discussion, it is appreciated that throughout the disclosed subject matter, discussions utilizing terms such as processing, computing, calculating, determining, or displaying, and the like, refer to the action and processes of processing systems, and/or similar consumer or industrial electronic devices or machines, that manipulate or transform data represented as physical (electrical and/or electronic) quantities within the registers or memories of the electronic device(s), into other data similarly represented as physical quantities within the machine and/or computer system memories or registers or other such information storage, transmission and/or display devices.

In regard to the various functions performed by the above described components, architectures, circuits, processes and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In addition, while a particular feature may have been disclosed with respect to only one of several implementations, such feature may be combined with one or more other features of the other implementations as may be desired and advantageous for any given or particular application. It will also be recognized that the embodiments include a system as well as a computer-readable medium having computer-executable instructions for performing the acts and/or events of the various processes.

What is claimed is:

1. A system, comprising:
    a cache memory configured for storing data;
    a memory configured for storing computer executable components;
    a processor configured for executing computer executable components stored in the memory, wherein the computer executable components comprise:
        a memory controller component configured for maintaining a history profile for the data stored in the cache memory;
        a tagging component configured for tagging the data stored in the cache memory as recurrent data in response to a determination, based on the history profile, that the data is previously stored in the cache memory and configured for tagging the data stored in the cache memory as non-recurrent data in response to a determination, based on the history profile, that the data is not previously stored in the cache memory; and
        a data management component configured for retaining the data in the cache memory in response to the tagging of the data as the recurrent data and configured for removing the data from the cache memory in response to the tagging of the data as the non-recurrent data.

2. The system of claim 1, wherein the tagging component comprises a filter associated with a probabilistic data structure associated with the history profile to determine if the data is previously stored in the cache memory.

3. The system of claim 2, wherein the filter is a Bloom filter.

4. The system of claim 2, wherein the tagging component is configured for randomly tagging the data as the recurrent data in response to a determination, based on the filter associated with the probabilistic data structure, that the data is not previously stored in the cache memory.

5. The system of claim 1, wherein the tagging component is configured for tagging the data based on a period of time that the data is stored in the cache memory.

6. The system of claim 5, wherein the data management component is configured for retaining the data in the cache memory in response to the tagging of the data as the recurrent data and a determination that the period of time satisfies a defined criterion.

7. The system of claim 5, wherein the data management component is configured for removing the data from the cache memory in response to the tagging of the data as the recurrent data and a determination that the period of time does not satisfy a defined criterion.

8. The system of claim 5, wherein the data management component is configured for removing the data from the cache memory in response to the tagging of the data as the non-recurrent data and a determination that the period of time does not satisfy a defined criterion.

9. A method for managing data in a cache memory, comprising:
    maintaining, by a system operatively coupled to a processor and memory, a history profile for data stored in a cache memory;
    tagging, by the system, data stored in the cache memory as recurrent data in response to a determination, based on the history profile, that the data is previously stored in the cache memory;
    tagging, by the system, data stored in the cache memory as non-recurrent data in response to a determination, based on the history profile, that the data is not previously stored in the cache memory;
    retaining, by the system, the data in the cache memory in response to the tagging of the data as the recurrent data; and
    removing, by the system, the data in the cache memory in response to the tagging of the data as the non-recurrent data.

10. The method of claim 9, wherein maintaining the history profile for data stored in a cache memory comprises associating a filter with a probabilistic data structure for the data stored in the cache memory.

11. The method of claim 9, wherein the retaining comprises retaining the data in the cache memory based on a period of time that the data is stored in the cache memory.

12. The method of claim 11, wherein retaining the data in the cache memory in response to the tagging of the data as the recurrent data further comprises determining that the period of time satisfies a defined criterion.

13. The method of claim 11, wherein removing the data in the cache memory in response to the tagging of the data as the non-recurrent data further comprises determining that the period of time does not satisfy a defined criterion.

14. The method of claim 9, further comprising randomly tagging, by the system, the data as the recurrent data in response to a determination, based on the filter associated with the probabilistic data structure, that the data is not previously stored in the cache memory.

15. A computing device, comprising:
a cache memory configured for storing data;
a processor configured for executing computer executable components stored in a memory configured for storing computer executable components, wherein the computer executable components comprise:
a memory controller component configured for maintaining a history profile for the data stored in the cache memory;
a determining component configured for determining whether or not to remove data from the cache memory based, on the history profile, whether the data is recurrent data previously stored in the cache memory or non-recurrent data not previously stored in the cache memory; and
a determining component configured for determining whether or not to remove the data from the cache memory based on the history profile whether the data is recurrent data previously stored in the cache memory for a period of time or non-recurrent data not previously stored in the cache memory for the period of time.

16. The device of claim 15, wherein the memory controller component is further configured for tagging the data as recurrent data in response to a determination, based on the history profile, that the data is previously stored in the cache memory.

17. The device of claim 15, wherein the memory controller is configured for randomly tagging the data as recurrent data in response to a determination, based on the history profile, that the data is not previously stored in the cache memory.

18. The device of claim 15, wherein the memory controller is configured for tagging the data as non-recurrent data in response to a determination, based on the history profile, that the data is not previously stored in the cache memory.

19. The device of claim 15, wherein maintaining the history profile for the data stored in the cache memory comprises associating a filter with a probabilistic data structure for the data stored in the cache memory, wherein the filter with a probabilistic data structure facilitates a determination of an amount of time in which data is stored in the cache memory.

* * * * *